Patented Aug. 1, 1939

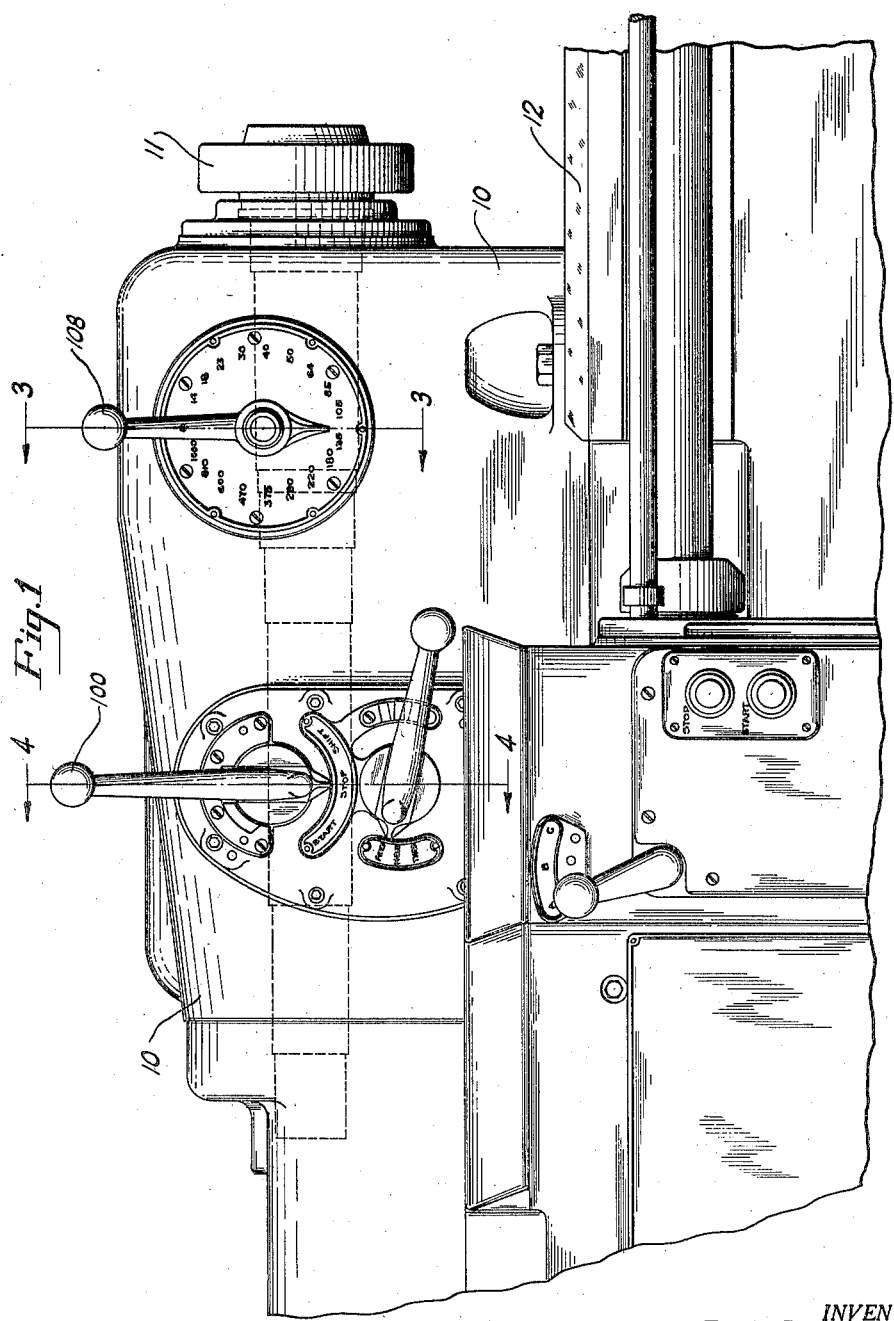

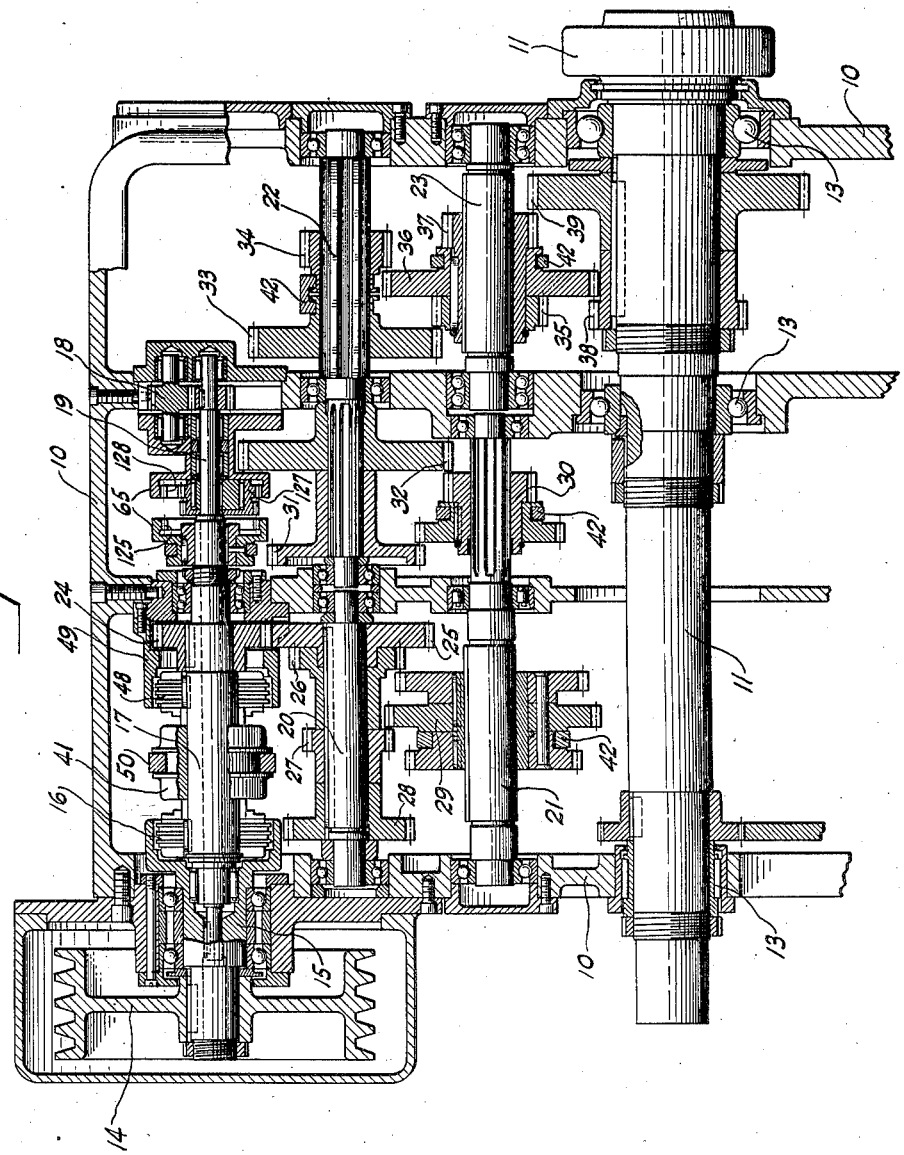

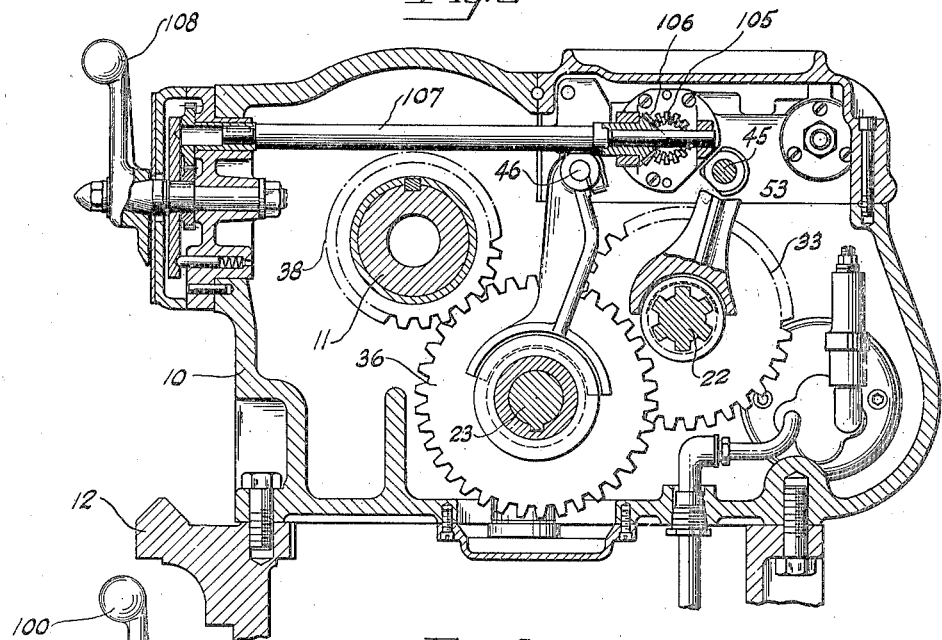
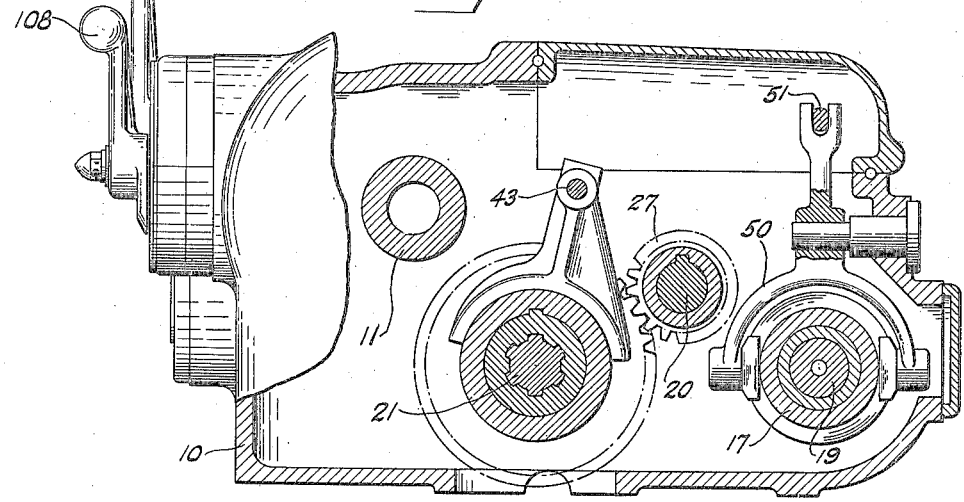

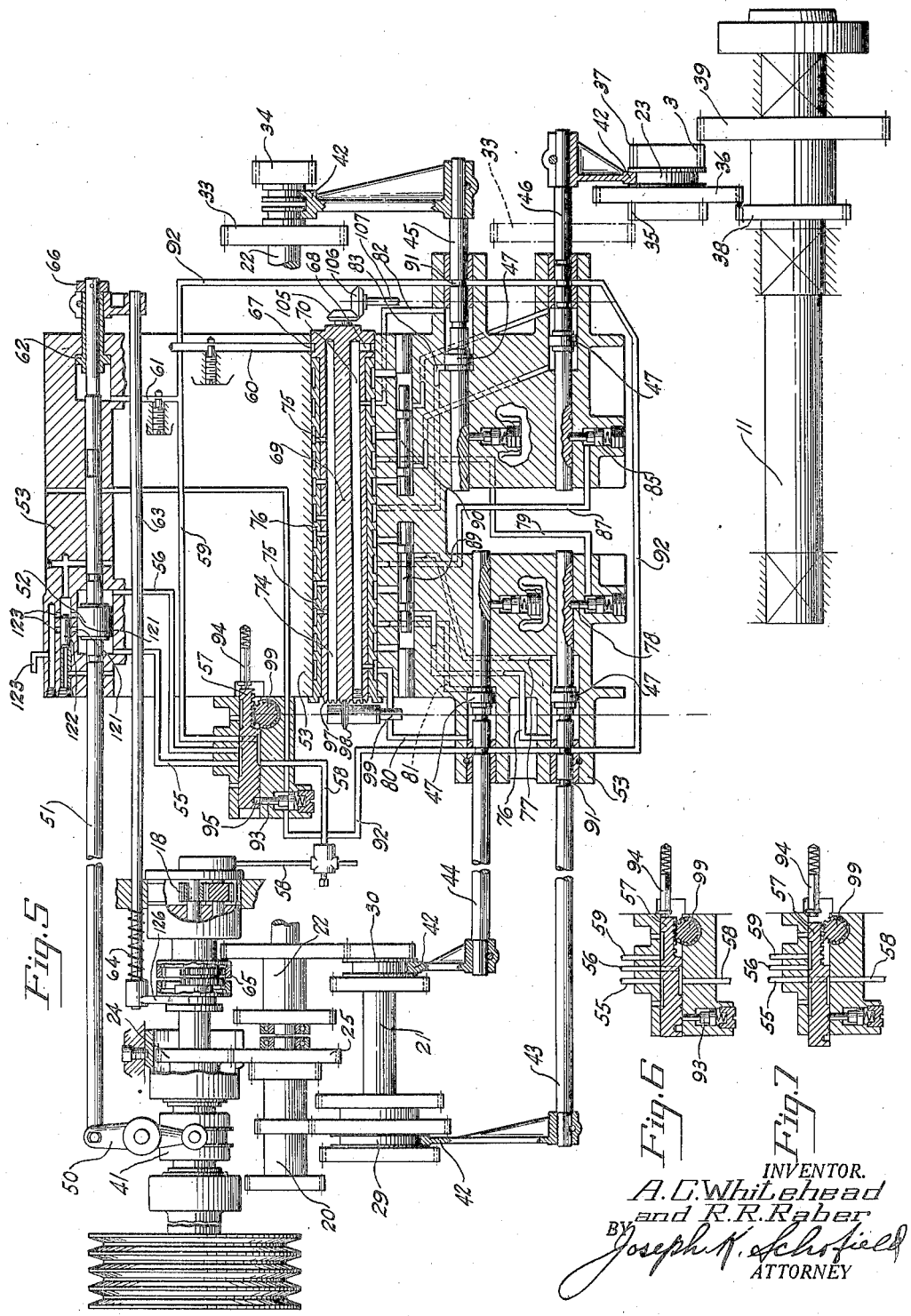

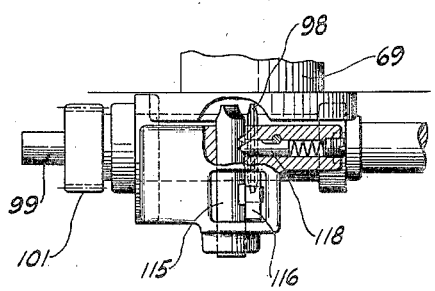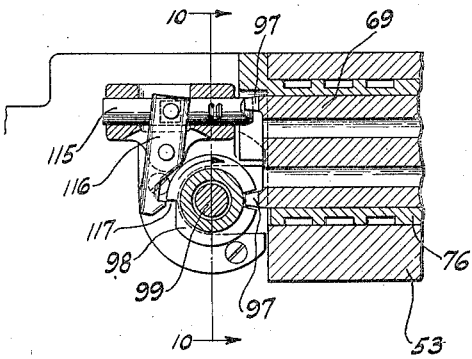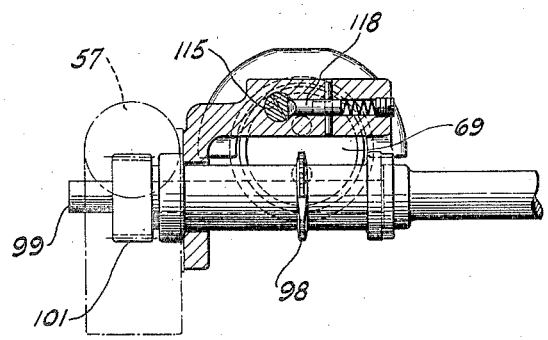

2,167,790

UNITED STATES PATENT OFFICE 2,167,790

LATHE

Alexander G. Whitehead, Hartford, and Robert R. Raber, West Hartford, Conn., assignors, by mesne assignments, to Niles-Bement-Pond Company, New York, N. Y., a corporation of New Jersey

REISSUED
MAY 7 - 1940

Application July 8, 1935, Serial No. 30,302

15 Claims. (Cl. 82—29)

This invention relates to metal cutting lathes and particularly to improved hydraulically operated means to effect different driving connections for the work supporting and rotating spindle so that the spindle may be rotated at a number of different speeds from a constant speed initial driving shaft.

A primary object of the invention is to provide an improved hydraulic system adapted to move operating members for transposing the positions of gears in the driving connections for a lathe headstock spindle, the hydraulic system being interlocked to prevent any movement of the controlling lever while the spindle driving gears are being shifted, and also maintained interlocked to prevent movement of the controlling lever to operative position after the gear shifting operation has been initiated until the gears are in a completely shifted position.

Another object of the invention is to provide locking means for the hydraulic distributing system so that this system cannot be changed or interfered with while the spindle is being rotated.

Another object of the invention is to provide a hydraulic distributing system enabling a liquid delivered under pressure from a single pump to be distributed to the parts of a lathe headstock to individually control a plurality of pistons movable to different positions to control the rotative speed of a headstock spindle, to lubricate the operative parts of the headstock during normal operation of the lathe, and to operate a brake to quickly stop rotation of the headstock spindle.

A feature of importance of the invention is that the distributing valve controlling the movements of the gear shifting pistons is rotatable and has a plurality of different angular positions, there being positive locking means for the distributing valve in each of its positions preventing angular movement thereof except when the valve for admitting fluid to the distributing system is in its central or neutral position.

Another object of the invention is to provide an interlocking means requiring the controlling handle to be moved to its gear shifting position after the shifting dial and the distributing valve have been moved to a new position before the controlling valve can be moved to operating position and the spindle started.

An finally it is an object of the invention to provide a continuous conduit for fluid under pressure open only when all shifting members are in operative positions, fluid in this conduit serving to withdraw a locking bolt from locking engagement with the manual controlling valve for the fluid so that this valve may be moved to operative position to rotate the spindle at any of its predetermined speeds.

With the above and other objects in view, our invention includes the features of construction and operation set forth in the following specification and illustrated in the accompanying drawings.

In the accompanying drawings annexed hereto and forming a part of this specification, we have shown our invention embodied in an engine lathe, but it will be understood that the invention can be otherwise embodied and that the drawings are not to be construed as defining or limiting the scope of the invention, the claims appended to this specification being relied upon for that purpose.

In the drawings:

Figure 1 is a front elevation of a complete headstock for a standard engine lathe made in accordance with the present invention.

Fig. 2 is a horizontal sectional view of the headstock, the spindle driving shafts being indicated as in a common plane for clearer illustration.

Fig. 3 is a vertical transverse section through the headstock taken on the plane of the line 3—3 of Fig. 1.

Fig. 4 is a view similar to Fig. 3 taken on the plane of line 4—4 of Fig. 1.

Fig. 5 is a diagrammatic view of the hydraulic system for shifting the spindle driving gears shown in Fig. 2, all of the operating means being shown as if in a common plane for better illustration.

Fig. 6 is a fragmentary view of Fig. 5 showing the manual control valve in its central neutral or spindle braking position.

Fig. 7 is a view similar to Fig. 6 showing the control valve in its normal or operative position for rotating the spindle.

Fig. 8 is a fragmentary vertical sectional view of the distributing valve of the hydraulic system adjacent one end.

Fig. 9 is a plan view partly in section of the parts shown in Fig. 8; and

Fig. 10 is an end elevation of the parts shown in Figs. 8 and 9 partly in section.

In the above mentioned drawings we have shown but one embodiment of the invention which is now deemed preferable, but it is to be understood that changes and modifications may be made within the scope of the appended claims without departing from the spirit of the invention.

Briefly, and in its broadest aspect, our invention may include the following principal parts: First, a headstock having a work supporting and rotating spindle therein, second, a plurality of shafts within the headstock disposed parallelly to the spindle; third, intermeshing gears some of which are slidable into different driving positions on said shafts; fourth, yoke members engaging the slidable gears and having pistons thereon movable within individual cylinders provided therefor; fifth, a source of fluid under pressure, a distributing valve whereby the fluid may be admitted to either end of selected cylinders for shifting the yoke members and gears to different positions; sixth, a manual controlling valve for said fluid under pressure; seventh, manual adjusting means for the distributing valve; and eighth, locking means for the manual controlling valve and the distributing valve.

In the operation of metal cutting engine lathes it is desirable to provide driving means for the work supporting and rotating spindle operating at a large number of widely different speeds. In the present instance eighteen speeds for the spindle are provided and another position of the driving means is provided enabling the spindle to be freely rotated by hand independently of its driving connections. The speeds for rotating the spindle should be instantaneously selectable and should not require the operator to shift numerous levers or manually transpose the driving gears.

The engine lathe as shown in the drawings and built according to the present invention is provided with but two manually operated control levers for controlling the headstock spindle rotation. One lever, or more accurately a dial, is movable to as many different angular positions as there are speeds available for the spindle and the position of this lever determines the speed of rotation of the spindle. One more position for this dial is provided for the free rotation of the spindle. A second lever controls the fluid admitting valve and is movable to three different angular positions corresponding to three axial positions of the valve. In one extreme position of the valve the main driving clutch is held in engaged or spindle rotating position for normal operation of the lathe, in the intermediate or neutral position the clutch is released and the brake is applied to quickly stop rotation of the spindle, and in the third or opposite extreme position the valve effects shifting of the driving gears for the spindle on the intermediate shafts between the initial driving shaft and the spindle.

The hydraulic system for, and contained in, a lathe headstock effects operation of a main driving clutch to rotate the spindle, operates the brake to stop the spindle promptly upon disengagement of the main clutch, effects changes in the positions of the gears to rotate the spindle at different speeds, and supplies fluid to a lubricating system. This hydraulic system is shown diagrammatically in Fig. 5. The driving connections for the spindle on the intermediate shafts within the headstock and their shifting means are more clearly shown in Fig. 2.

Referring more in detail to the figures of the drawings, there is provided a headstock 10 having a work supporting and rotating spindle 11 therein. The headstock is supported upon a lathe bed 12 of any standard or preferred type which forms no part of the present invention and therefore will not be further described. The spindle 11 is supported within the headstock 10 upon suitably spaced apart bearings 13. The main driving pulley 14 which preferably is drivingly connected to a constantly rotating motor (not shown), is directly fastened to a short shaft 15 rotatably mounted within the headstock 10 which may also have provided thereon one member of the driving clutch 16 which may be of the multi-disc type. Keyed to this main driving shaft 15 is an elongated shaft 19 extending parallelly with the spindle 11 and suitably supported upon anti-friction bearings. Near the end of this elongated shaft opposite that of the pulley 14 is a gear type rotary pump 18 for furnishing fluid under pressure. This fluid is used within the headstock to start and stop the spindle 11, to operate the gear shifting mechanism and to provide lubricant for the mechanism within the headstock while it is in operation. To continuously rotate the pump 18 shaft 19 is directly keyed to the short shaft 15 so that the pump is operated at all times when the pulley 14 and shaft 15 are rotated. Sleeve 17 surrounds and is rotatable upon a portion of the length of shaft 19 and carries the opposite part of driving clutch 16. A clutch engaging member 41, a clutch 48 operating as a brake and a main driving gear 24 are also mounted on sleeve 17. These parts will hereinafter be more fully described.

Referring first to the driving connections between the main driving pulley 14, the sleeve 17 and the spindle 11, it will be seen that there are a plurality of shafts disposed parallelly between the sleeve 17 and the spindle 11, these shafts being 20, 21, 22 and 23. Each shaft 20, 21, 22 and 23 has a plurality of gears thereon some of which are slidable to give different driving connections at different speed ratios between the sleeve 17 and the spindle 11. A gear 24 keyed to the sleeve 17 forms the initial driving gear for the spindle 11 and is in constant mesh with a gear 25 keyed in position on the first of the intermediate shafts 20. On this shaft 20 are keyed in fixed position three gears 26, 27 and 28 each having a different number of teeth. Adapted to mesh individually with these gears 26, 27 and 28 are three gears forming a cluster 29 on the second intermediate shaft 21 slidable as a unit on suitable splines thereon. With any gear 26, 27 or 28 in mesh with one of the gears of cluster 29 a pair of gears 30 slidable on an extended portion of the second intermediate shaft 21 are rotated. This pair of gears 30 is slidable on suitable splines on this second shaft 21 and meshes individually with spaced gears 31 or 32 fixed in position on third intermediate shaft 22. On an extended portion of this third shaft 22 are gears 33 and 34 slidable thereon which mesh individually with gears 35 and 36 on fourth intermediate shaft 23. In one extreme position of the gear group on the fourth shaft 23 gear 33 meshes with gear 35 and gear 36 with gear 38 or gear 34 meshes with gear 36 and gear 37 meshes with gear 39. In the opposite or right hand position of gears 33 and 34, gear 33 meshes with gear 35 and gear 37 meshes with gear 39. As shown in Fig. 2, gears 38 and 39 are keyed directly to the spindle 11. In the intermediate position of the gear cluster formed by gears 35, 36 and 37 on the fourth shaft 23 the spindle 11 is free from any driving connections and may therefore be rotated freely by hand. By sliding the groups of gears on shaft 21, by sliding the gears coupled together on shaft 22, and by sliding the gear cluster 35, 36 and 37 on shaft 23 to either extreme position eighteen different rotative speeds of rotation of the spindle 11 can be obtained while the main driving shaft 15 and its pulley 14 are constantly rotating at one speed only. The hydraulic means and the controlling means therefor to shift the gear clusters 29 and 30 on shaft 21, the gears 33 and 34 on shaft 22 and the group composed of gears 35, 36 and 37 on shaft 23 will now be described. Each of the above gears and clusters is provided with an annular groove into which fits a suitable yoke 42. Each yoke 42 forms an arm secured to a slidable bar or rod 43—44—45 or 46 (see diagram Fig. 5), these rods each having pistons 47 at an intermediate portion thereof. It is by shifting these bars or rods 43—44—45 and 46 back and forth axially that different driving connections between shaft 15 and the spindle 11 for different rotative speeds of the spindle are obtained.

On the sleeve 17 and keyed thereon is the movable member of the main clutch 16 and also the movable member 48 of a braking clutch, the fixed member 49 of which is secured to the frame of the headstock 10. To operate these clutches the movable member or spool 41 is engaged by a yoke member 50 pivotally mounted on the headstock 10 and operated to engage either of the clutches by means of a longitudinally extending rod 51 having a piston 52 thereon. Axial movement of rod 51 toward the right frictionally engages the parts of driving clutch 16 and rotates the sleeve 17 when the pulley 14 is rotated. Movement of the rod 51 to the left frictionally engages the braking clutch 48 with the part 49 and prevents or stops rotation of the spindle 11.

By reference to Fig. 5 it will be seen that by movement of the pistons 47 on rods 43, 44, 45 and 46 to laterally move the yokes or fork members 42 connected thereto, the slidably mounted gears may be conveniently moved to their different selective operative positions. It will be noted that the clusters of three gears on shafts 21 and 23 each have three different positions. Particular means presently will be described for moving these gears to their respective extreme and intermediate operative positions and for retaining them in proper operative positions during operation of the lathe.

Referring particularly to the hydraulic system and mechanism and first to the mechanism for shifting the main clutch spool 41 to its driving or operative positions and to a position to operate the spindle brake, we provide the fluid operated piston 52 on rod 51 within a short cylinder. The cylinder may be formed in a body member 53 secured in fixed position within the headstock 10. This piston 52 is directly connected by means referred to above to the clutch lever 50, so that movement of the piston 52 oscillates the clutch lever 50 about its pivotal support and moves clutch spool 41 in either direction. The movement of the piston 52 therefore in one direction will move the clutch lever 50 to engage the driving clutch 16 and movement to the opposite end of its cylinder will engage the braking clutch 48. In order to admit fluid under pressure to opposite ends of the cylinder for piston 52, ports are provided at opposite ends connected by suitable conduits 55 and 56 to the casing of a manually operated control valve 57. The connections for manually moving this valve to its different positions will presently be described. The manually operated control valve 57 in the position shown in the diagram (Fig. 5) admits fluid to effect the gear shifting operation and during this operation no fluid under pressure is admitted to either end of the cylinder within which piston 52 operates. Means to slowly rotate the headstock gearing during the gear shifting operation will presently be described. These slow rotating means are engaged by movement of rod 63 toward the right by admission of fluid through conduit 61 against piston 62. Movement of this piston 62 by its connection as shown in Fig. 5 to the rod 51 by collar 66 will move the rod 51 so that its piston 52 will be centrally disposed in its cylinder and with the clutch operating yoke in its neutral position.

The position of valve 57 shown in Fig. 6 admits fluid to conduit 56 and therefore forces the piston 52 and rod 51 to the left to operate brake 48. This is the central or neutral position of valve 57. Fig. 7 shows the valve 57 in its normal operative or spindle rotating position in which position fluid is admitted to conduit 55. When conduit 55 is supplied with fluid, conduit 56 may exhaust fluid from the cylinder for piston 52 past the valve 57.

Fluid to effect shifting operation of the gears to rotate spindle 11, to operate the clutch spool 41 to either position, and to lubricate the moving parts within the headstock is supplied by the gear pump 18 mounted on the end of elongated shaft 19 so that the pump is constantly rotating. From the main pump 18 there is provided a supply conduit 58 leading directly to a port entering the bore within which is provided the manually controlled valve 57. This valve in the position shown in Fig. 5 places a circumferential groove therein so that fluid may be admitted to conduit 59 leading to the gear shifting mechanism. All of this gear shifting mechanism may be mounted within or associated with body member 53 partially shown in Fig. 3. As shown in Fig. 5, fluid is being supplied through conduit 59 to branch conduit 60 from which fluid by means presently to be described is supplied to the selected cylinders within which operate the gear shifting pistons 47. A branch 61 of this conduit 59 supplies fluid to a cylinder within which a piston 62 operates. Piston 62 is fixed to the end of rod or bar 51 so that it may have limited slidable movement thereon. Piston 62 is attached by means of an arm to rod 63 lying parallelly to rod 51. Movement of rod 63 against spring 64 when fluid is admitted to conduit 61 and against piston 62 moves a gear reduction mechanism 65 mounted on sleeve 17 into operative relation to driving members on shaft 19 so that the driving gear 24 on sleeve 19 is slowly rotated during the shifting operation.

These speed reducing means 65 comprise a planetary gear system normally disengaged but movable as above described for very slowly rotating the driving gear 24 on the main driving sleeve 17 and are engaged simultaneously with movement of the control valve 57 to its shifting position as above described. By slowly rotating the gearing during the period during which gears are being shifted, the movements of these gears are facilitated and clashing of gears is prevented. The piston 62 is in the form of a sleeve surrounding and slidable on the extended and reduced end of the main clutch piston rod 51. When pressure is admitted to the shift operating mechanism as indicated in the diagram (Fig. 5), the piston 62 is moved to its extreme right hand position simultaneously with movement of the piston 52. In the position assumed during the gear shifting operation, this differential mechanism 65 is in operative position and is driven from shaft 19 to slowly rotate the gear 24 on sleeve 17 at a greatly reduced ratio relative to the main driving shaft 19. When the control valve 57 is moved from its gear shifting position pressure is immediately released from the cylinder for piston 62 which permits the light spring 64 to disengage the planetary gears and thus stop rotating the gears. By means of a collar 66 on the end of rod 51 movement of the clutch spool 41 to stop rotation of the spindle 11 serves to positively move rod 63 toward the left to disengage the speed reducing means 65.

In order to move the gears on shafts 20, 21, 22 and 23 to different operative positions to effect the different rotative speeds for the spindle 11, there is provided a cylindrical distributing valve 69 having a large number of radially disposed ports 75 extending from longitudinal conduits within the valve to the surface thereof. This cylindrical distributing valve may be mounted in a portion of the body member 53 and housed within the headstock 10. Fluid under pressure is admitted from conduit 60 to a longitudinal conduit 70 within valve 69 by means of an annular groove 67 extending about valve 69 and a short radial conduit 68. From conduit 70 fluid may be simultaneously admitted to any one or several of these radial ports 75. The radially disposed ports 75 from this longitudinal conduit 70 extend to recesses formed in a sleeve 76 secured within body member 53 and surrounding substantially the entire length of the valve 69. It will be understood from this diagram that the distributing valve 69 is shown in a single operative position for one particular speed of the spindle 11 but that there are a number of different angular positions of the valve 69 each one positioning the valve for admitting fluid through appropriate radial ports 75 and individual conduits to position the gear shifting levers 43—44—45 and 46 for different speeds or for free rotation of the spindle. A second longitudinal conduit 74 within valve 69 is connected by a large number of radial conduits or ports 75 through which fluid may be exhausted from the individual cylinders for pistons 47 to the return tank (not shown).

Following the conduits between the sleeve 76 surrounding the valve 69 and the cylinders within which pistons 47 for the gear shifting rods operate for one position of the valve 69 as shown in Fig. 5, it will be seen that the slidable gear cluster 29 meshing with gears 26, 27 and 28 on shaft 20 and controlled by a single piston on rod 43 are moved by their gear shifting lever to three individual axial positions. The piston 47 on rod 43 is moved to either end of its cylinder or to the middle thereof respectively for these three positions.

As shown in the diagram, this piston 47 on rod 43 has been moved to its intermediate position and is being maintained in this position by a locking plunger 78 spring pressed toward and engaging within a recess provided in the rod 43. This detent or plunger 78, when no fluid under pressure is forced into the cylinder within which it operates, is held by its spring as shown in locking engagement with the piston rod 43. For a speed requiring a position of this first shift lever 43 with its piston 47 at either end of its cylinder, pressure is admitted to the appropriate end of the operating cylinder therefor through conduit 76 or 77 and simultaneously, by a separate conduit 79, pressure would be admitted to the cylinder for the plunger 78, thus retracting the plunger from engagement with the rod and permitting movement of the piston 47 and the gear shifting lever 42 on rod 43 to either extreme position.

Shift rod 44 has two positions only in which its piston 47 is at either of the opposite ends of its cylinder and is moved back and forth by fluid supplied through conduits 80 and 81 extending between opposite ends of the cylinder and individual different ports 75 in the sleeve surrounding the distributing valve.

Shift rod 45 also has but two positions similar to shift rod 44 and operates in exactly the same manner from its own individual conduits 82 and 83 extending between opposite ends of its cylinder and ports 75 in the sleeve surrounding the distributing valve 69.

Shift rod 46 is provided with a piston operating within a cylinder and has three operative positions, the positions at opposite ends of its cylinder being positions drivingly connecting the spindle 11 for different rotative speeds and its midposition for disconnecting the driving shaft 15 from the spindle 11 to permit free rotation of the spindle by hand. It will be noted that this piston 47 on rod 46 has a detent or plunger locking means 85 similar to plunger 78 for rod 43 and this is operated in the same manner. A small piston on this plunger operates within a short vertical cylinder the upper end of which is connected by a suitable conduit 87 to an individual port 75 in the sleeve 76 surrounding the main valve 69. Without pressure in its conduit 87 the plunger 85 is held by its spring in locked engagement with the rod 46 and thus holds the shaft 46 and the piston 47 from movement beyond its central position. When shaft 43 or 46 is to be moved from its central position to an end position its locking bolt 78 or 85 is moved from engagement with the shaft by applying fluid to the cylinder within which the bolt operates. When movement of these shafts from an end position to the central position is to be effected, no fluid is required to be admitted to release the bolt and, when the rod 43 or 46 reaches its midposition, the bolt 78 or 85 is forced upward into locking position by its spring.

To control admission of fluid to the cylinders for locking plungers 78 and 85, independent auxiliary valves 89 and 90 are provided moved to open or close conduits 79 or 87 by pressure supplied to their ends from the distributing valve 69 by individual radial ports 75 on the valve 69 and sleeve 76.

When any piston 47 is moved to one end of its cylinder or to an intermediate position by fluid under pressure from the distributing valve 69 through the individual conduits referred to above, there are ports open for the conduits from the opposite ends of the cylinders to the exhaust channel 74 within the distributing valve 69. From this channel the fluid may be returned by any suitable means to the drain tank provided with the machine.

For each operative position of the valve 69 a number of ports 75 in the valve 69 are aligned with ports in the sleeve 76 and are open to different combinations of conduits leading to opposite faces of individual pistons 47. One set of these ports connects the longitudinal conduit 70, in which fluid is under pressure, with the desired face of the piston 47 on the separate rods 43—44—45 and 46 to move the gears to proper selected position for the particular rotative speed called for. The other series of ports connects the exhaust conduit 74 within the valve 69 with the opposite faces of these pistons. By rotating the valve 69 to its different angular positions the particular combination of open ports necessary to effect the eighteen different rotative speeds for the spindle 11 and for the spindle to be freely rotatable may be obtained.

It is essential in any gear shifting mechanism that operation of the main control clutch 16 and its lever be prevented during the shifting operation and until the shifting operation has been entirely completed. If a speed change is initiated the spindle 11 should not be started rotating until the gears are moved to their new positions. For that reason a hydraulic interlocking system is provided in order that the manually controlled valve 57 may be locked against movement from its gear shifting position to its clutch engaging or operative position to rotate the spindle 11 until each gear of the speed change system has been moved to the desired or selected position.

It will be noted that upon the rods 43—44—45 and 46 for the different gear shifting members there are spaced circumferential grooves 91 therein. Rods 43 and 46 have three such grooves suitably spaced apart and rods 44 and 45 have but two of these grooves. One groove 91 is provided for each operative position of its piston 47 and gear shifting yoke or fork 42. The purpose of these grooves 91 is to admit fluid to a special conduit 92 extending from the source of supply of fluid, as from conduit 59, and to enter each bore for the shifter rods 43—44—45 and 46 by these grooves when the rods are in operative positions only. The fluid can pass successively past each of these rods completely through the conduit 92 only when each of the rods 43—44—45 and 46 is in an operative position. After passing through the entire length of the conduit 92 the fluid enters a small cylinder and releases a locking bolt 93 from engagement with the manually operated valve 57, thus permitting this valve 57 to be moved back and forth to its operating and braking position.

This locking bolt 93 normally is spring pressed toward its locking position and while the shifting operation is being effected the plunger 93 and its piston are retained by their spring in their upper position so that the plunger enters the deep recess 95 provided in this manual valve 57. As soon, therefore, as the control valve 57 is moved to its position as shown in Fig. 5 to change the rotative speed of the spindle 11 the plunger 93 by its spring is forced upward to lock the valve 57 in position. As soon as the gear shifting rods necessary to make the speed change have moved to their new positions the conduit 92 is open all the way from its pressure supply end at the valve 57 to the upper end of the cylinder in which the valve locking plunger 93 operates. This pressure, therefore, releases the valve 57 by forcing the plunger 93 downward. The valve 57 becomes locked only when it has been moved to its speed changing position in which position only, the plunger 93 can enter the deep recess in the valve 57. When thus locked the valve 57 remains locked until after the necessary shifting of gears has been completed. As soon as the shifting is entirely complete the valve 57 is released by plunger 93 being forced outwardly from its recess 95 after which the valve is returned to its central position by a spring pressed plunger 94 pressing against one end. The plunger 94 is slightly offset laterally from the valve 57 and is prevented from moving the valve 57 past its central position to the operating or running position thereof by being stopped by engagement of its flange by the end wall of the valve casing. Slight conical depressions in the valve 57 spaced along its length are provided so that the plunger 93 may engage therewith and thus resiliently retain the valve 57 in its neutral or central and operating positions.

It is also essential that the distributing valve 69 should be locked in position during normal operation of the lathe and during the gear shifting operation. The only time valve 69 should be free to be moved is during the period when the spindle is not rotating and the valve 57 is in its central or neutral position. At one end of the distributing valve 69, therefore, a plurality of teeth and notches 97 are provided, there being one notch for each operative or angular position of the valve. Engaging any one of these notches is a circumferential projection 98 adjacent the end of a manually operating shaft 99 connecting with the operating lever 100 for valve 57 at the front of the headstock presently to be more fully described. A short angular section of the circumferential projection 98 is cut away, this cut away portion being adjacent the notches 97 of the distributing valve 69 only when the control valve 57 is in its central or neutral position. In this central or neutral position only of the control valve 57 the distributing valve 69 can be angularly adjusted. With valve 57 in this neutral or central position fluid forces piston 52 toward the left to engage the braking clutch 48 and stop rotation of the spindle 11. In any other position of the control lever 100 and valve 57 the distributing valve 69 is locked in position by the teeth and notches 97 on the end thereof being interlocked with the peripheral projection 98 on the shaft 99 oscillating with and operating the control valve 57.

To operate the valve 57 to its different positions by oscillation of the lever 100, a gear 101 is provided on the shaft 99 the teeth of which mesh with rack teeth cut into an end of the valve 57. By moving the lever 100 between the extreme positions indicated in Fig. 1 the valve 57 may be moved to its operative, neutral and gear shifting positions.

One other condition is essential for complete interlocking and to prevent starting the lathe at one speed when the valve 69 is set at its position for another speed. When the distributing valve 69 has been adjusted to a new position thus initiating but not effecting a shifting of the gears on shafts 21, 22 and 23 to new positions, it is desirable to prevent movement of the control valve 57 to operating position until after the shifting operation has been completed. To rotate the valve 69 there is provided at one end a bevel gear 105 in mesh with a corresponding bevel gear 106 on the rear end of a forwardly extending shaft 107. At the front of the machine there is a manually operable lever 108 by means of which the shaft 107 and the valve 69 may be rotated. To indicate the adjustment of the valve 69 a dial closely adjacent the lever 108 may be provided with speed designating numerals as shown in Fig. 1. As shown in Fig. 3, lever 108 may be connected to shaft 107 by intermeshing gears.

To prevent movement of the control valve 57 to its operating position until after a gear shifting operation has been completed in the event the distributing valve 69 has been moved to a new position without completing the shifting operation, a mechanically operating latch 115 is provided. This latch 115 has a wedge shaped end which in its locking position engages between adjacent teeth 97 on the end of valve 69. To operate the latch 115 a pivoted lever 116 connected to the latch 115 engages at its end opposite the latch 115 an angular notched portion 117 in the annular projection 98. Rotation of the shaft 99 in a direction indicated by an arrow in Fig. 8 to effect a gear shifting operation is permitted at any time from neutral position when valve 69 is in one of its operative positions, the cut away portion of the peripheral projection 98 permitting movement of the lever 116. If the latch 115 is in its outer position the side of notch 117 forces lever 116 to move the latch to engage between adjacent teeth of valve 69. Rotation in the opposite direction of shaft 99 to move valve 57 to its operative position to engage the driving clutch 16 is prevented unless the latch 115 is in its locking position as shown in Fig. 8. Movement of valve 57 by rotation of shaft 99 and gear 101 forces this pivoted lever 116 in a direction to move the latch 115 into locking engagement between the teeth 97 on the end of valve 69. The lower end of the pivoted lever 116 is held in its locking position by the circumferential projection 98 so long as the valve 57 is in its gear shifting position. Valve 69 is therefore prevented from being rotated while gears are being shifted. To resiliently retain the latch in either of its positions, a spring detent 118 may engage suitable notches cut into the side of the latch.

The planetary gearing designated generally by reference 65 by means of which the intermediate shafts 20—21—22 and 23 for the spindle 11 are slowly rotated during the gear shifting operation includes a driving member for these shafts in the form of an internal gear 125 splined to and slidable with sleeve 17 surrounding the elongated shaft 19. The yoke or fork 126 on the actuating rod 63 engages an annular groove provided in gear 125 so that movements of the gear may be effected in either direction by operation of the actuating rod as referred to above. Movement to the right engages the internal gear 125 with one of the gears of a planetary unit 127 the other member of which meshes with an internal gear 128 forming the fixed or sun gear of the planetary system. The planetary member 127 includes a double gear having different numbers of teeth on the individual gears. This member 127 is rotatable upon a supporting member eccentric to the shaft 19 and which is keyed directly to the constantly rotating shaft 19 so that rotation and revolving movements of this member 127 will slowly rotate the internal gear 125 on the sleeve 17. This sleeve 17 constitutes the driving member for the spindle 11 and carries the main driving gear 24 thereon meshing with gear 25 on the first intermediate driving shaft 21. The planetary gears are only in mesh when the manually controlled valve 57 is in its gear shifting position. At that time the clutches 16 and 48 are released for the reason that pressures on opposite sides of piston 52 are equal and movement of rod 63 to the right by means of collar 66 on rod 51 prevents the rod 51 from movement to a position engaging the driving clutch 16. Conduits 55 and 56 in the position shown in Fig. 5 are in communication with each other by a connecting recess in the valve 57.

For the purpose of utilizing the fluid under pressure furnished by pump 18 as a source of lubricant, the fluid chosen as the hydraulic medium may be a standard lubricating oil. From the cylinder within which the piston 52 operates there are conduits 121 leading to a small cylinder within which a loosely fitted piston 122 operates. From this latter cylinder there are conduits 123 adapted to be directly connected to a lubricant distributing system (not shown). With the piston 52 in either its gear shifting or operating position lubricant under pressure is supplied to conduits 123 from either end of the cylinder for piston 52 through conduit 55 or 56. As will be seen in Fig. 5, no fluid will pass into conduit for lubrication purposes with the piston 52 in its neutral position. The entire force of the pump will therefore be available to effect gear shifting operation.

What we claim is:

1. In a hydraulic speed changing system for machine tools having a spindle and driving means therefor including a plurality of members to be shifted to change the speed of said spindle, the combination of shifting members therefor each having a piston thereon, cylinders within which said pistons operate, a source of fluid under pressure, a distributing system for said fluid including a main distributing valve movable to different positions for the different speeds of said spindle, a manually controlled valve controlling operation of said spindle driving means and also controlling movement of said shifting members when said distributing valve is moved to different positions, and means preventing movement of said manually controlled valve while said members are being shifted.

2. In a hydraulic speed changing system for machine tools having a rotatable spindle and a plurality of gears to be shifted whereby the speed of said spindle may be varied, the combination of shifting members therefor each having a piston thereon for effecting movement of said gears, cylinders within which said pistons operate, a main driving clutch, hydraulically operated means for engaging and disengaging said clutch, a source of fluid under pressure, a distributing system for said fluid to said shifting members and to said clutch operating means, a manually operated valve admitting fluid to said shifting means in one position and to said clutch operating means in another position, and means for positively locking said manually controlled valve in position during a gear shifting operation.

3. In a hydraulic speed changing system for machine tools having a rotatable spindle and a plurality of gears to be shifted whereby the rotative speed of said spindle may be changed, the combination of shifting members therefor each having a piston thereon for effecting movements of said gears, cylinders within which said pistons operate, a main driving clutch, hydraulically operated means for engaging and disengaging said clutch, a source of fluid under pressure, a distributing system for said fluid to said shifting members and to said clutch operating means, a manually operated valve admitting fluid to said shifting means in one position and to said clutch operating means in another position, and locking means preventing movement of said manual valve to operate said clutch during a gear shifting operation, said locking means being released as soon as said gear shifting operation has been completed.

4. In a hydraulic speed changing system for machine tools having a rotatable spindle and a gear cluster to be shifted whereby the speed of said spindle may be changed, the combination of a shifting member having a piston thereon for effecting movement of said gear cluster to a plurality of operative positions, a cylinder within which said piston operates, a main driving clutch, hydraulically operated means for engaging and disengaging said clutch, a source of fluid under pressure, a distributing system for said fluid to said shifting member and to said clutch operating means, a manually operated valve admitting fluid to said shifting means in one position and to said clutch operating means in another position, means preventing movement of said manual valve to operate said clutch during a gear shifting operation, and a hydraulic circuit releasing said valve for movement when said shifting member has completed its movement to any of its operative positions.

5. In a hydraulic speed changing system for machine tools having a spindle, rotating means therefor and speed changing means for said spindle including a plurality of slidable members for effecting changes thereof, the combination of pistons on said slidable members operating within cylinders, a source of fluid under pressure, a distributing system therefor having a multi-port distributing valve whereby fluid may be directed to individual cylinders to move said pistons individually to opposite ends of their cylinders to effect different selected speeds of said spindle, means to lock said distributing valve in different operative positions, and means to unlock said distributing valve for movement to another operative position only when the rotating means are inoperative.

6. In a hydraulic speed changing system for machine tools having a spindle and rotating and speed changing means therefor including a plurality of slidable members for effecting the speed changes thereof, the combination of pistons on said slidable members operating within individual cylinders, a source of fluid under pressure, a distributing system therefor having a multi-port distributing valve whereby fluid may be directed to move any combination of said pistons individually to opposite ends of their cylinders, a manually operated valve to effect engagement and disengagement of said driving means, means to lock said distributing valve in different operative positions during operation of said spindle rotating means and during operation of said speed changing means, and means to unlock said valve for movement to another operative position only when the rotating means are inoperative.

7. In a hydraulic speed changing system for machine tools having a spindle and hydraulic rotating and speed changing means therefor, the combination of a source of fluid under pressure, a distributing system for said fluid to said speed changing means including a multi-port valve therein, a manually controlled valve movable to positions to direct fluid to control the spindle rotating means and to control said speed changing means, and means to lock said manually controlled valve in position as soon as said valve is moved to its speed changing position, said locking means retaining said valve in position until the speed changing operation has been completed.

8. In a hydraulic speed changing system for machine tools having a spindle and hydraulic rotating and speed changing means therefor, the combination of a source of fluid under pressure, a distributing system for said fluid to said speed changing means including a multi-port valve therein, a manually controlled valve movable to positions to direct fluid to control the spindle rotating means and to control said speed changing means, means to lock said manually controlled valve in position as soon as said valve is moved to its speed changing position, said means retaining said valve locked in position until the speed changing operation has been completed, and means to lock said multi-port valve in its adjusted position during the speed changing operation.

9. In a hydraulic speed changing system for machine tools having a spindle and hydraulic rotating and speed changing means therefor, the combination of a source of fluid under pressure, a distributing system for said fluid to said speed changing means including a multi-port valve therein, a manually controlled valve movable to positions to direct fluid to control the spindle rotating means and to control said speed changing means, means to lock said manually controlled valve in position as soon as moved to its speed changing position, said means retaining said valve locked until the speed changing operation has been completed, and means operated by said manually controlled valve to lock said multi-port valve in adjusted position when said manually controlled valve is moved to its speed changing position.

10. In a hydraulic speed changing system for machine tools having a spindle and hydraulic rotating and speed changing means therefor, the combination of a source of fluid under pressure, a distributing system for said fluid to said speed changing means and to operate said spindle rotating means, a manually controlled valve movable to positions for admitting fluid to said spindle rotating means and to said speed changing means, means to lock said manually controlled valve in position when moved to its position to effect a speed change, and means to release said valve and return said valve to neutral position when the speed changing operation has been completed.

11. In a hydraulic speed changing system for machine tools having a spindle and hydraulic rotating and speed changing means therefor, the combination of a source of fluid under pressure, a distributing system having a rotary distributing valve movable to selected positions for different predetermined speeds of said spindle, a manually controlled valve for admitting fluid to said spindle rotating means in one position and to said speed changing means in another position, means to lock said manually controlled valve in position when moved to its position for effecting a speed changing operation, means to release and return said valve to neutral position when the speed changing operation has been completed, and means locking said rotary distributing valve in selected position when said manually controlled valve is in its spindle rotating and speed changing positions.

12. In a hydraulic speed changing system for machine tools having a spindle and hydraulic rotating and speed changing means therefor, the combination of a source of fluid under pressure, a distributing system for said fluid to said speed changing means and to control said spindle rotating means, a manually controlled valve for admitting fluid to said spindle rotating means and to said speed changing means, a plunger locking said manually controlled valve in position when moved to its speed changing position, and hydraulically operated means to withdraw said plunger and release said valve for movement to its spindle rotating position when a speed changing operation has been completed.

13. A driving mechanism for lathe spindles comprising in combination, a headstock, a work supporting and rotating spindle therein, a main driving pulley on said headstock for said spindle, selective driving connections between said pulley and spindle, an elongated shaft within said headstock in axial alignment with and rotated by said pulley, a sleeve surrounding said elongated shaft having a main driving gear thereon, a disengageable clutch drivingly connecting said sleeve and pulley, a speed reduction unit between said elongated shaft and sleeve, means to engage and disengage said clutch, and means to engage said speed reduction unit upon disengagement of said clutch.

14. A driving mechanism for lathe spindles comprising in combination, a headstock, a work supporting and rotating spindle therein, a main driving pulley on said headstock for said spindle, selective driving connections between said pulley and spindle, an elongated shaft within said headstock in axial alignment with and rotated by said pulley, a sleeve surrounding said elongated shaft having a main driving gear thereon, a disengageable clutch drivingly connecting said sleeve and pulley, a speed reduction unit between said elongated shaft and sleeve, means to engage and disengage said clutch, and means to engage and disengage said reduction unit whereby said driving gear for said spindle is rotatable at a speed equal to or materially less than said driving pulley, said clutch being engaged only when said speed reduction unit is disengaged and said speed reduction unit being engaged only when said clutch is disengaged.

15. A driving mechanism for lathe spindles comprising in combination, a headstock, a work supporting and rotating spindle therein, a main driving pulley on said headstock for said spindle, selective driving connections between said pulley and spindle, an elongated shaft in said headstock in axial alignment with and rotated by said pulley, a sleeve surrounding said elongated shaft having a main driving gear thereon, a disengageable clutch drivingly connecting said sleeve and pulley, a brake for said sleeve, a speed reduction unit between said elongated shaft and sleeve, and a single manually controlled valve movable to three operative positions to individually engage said clutch, said brake, and said reduction unit.

ALEXANDER G. WHITEHEAD.
ROBERT R. RABER.